United States Patent [19]

Pappas

[11] Patent Number: 5,720,217
[45] Date of Patent: Feb. 24, 1998

[54] ROTISSERIE APPARATUS FOR COOKING FOOD ITEMS

[75] Inventor: Athan P. Pappas, Charlotte, N.C.

[73] Assignee: T & P Hoagie Systems, Inc., Charlotte, N.C.

[21] Appl. No.: 511,789

[22] Filed: Aug. 7, 1995

[51] Int. Cl.$^6$ ............................................. A47J 37/00
[52] U.S. Cl. ........................ 99/421 H; 99/421 P; 426/523
[58] Field of Search ............................. 426/523; 99/419, 99/421 H, 421 P, 421 R, 444; 126/41 B

[56] References Cited

U.S. PATENT DOCUMENTS

| | | | |
|---|---|---|---|
| 2,885,950 | 5/1959 | Stoll et al. | 99/340 |
| 3,273,489 | 9/1966 | Wilson | 99/421 |
| 3,295,434 | 1/1967 | Wilhelm et al. | 99/346 |
| 3,649,812 | 3/1972 | Wilson | 218/396 |
| 3,734,740 | 5/1973 | Zenos | 99/342 |
| 4,158,991 | 6/1979 | Nakashima | 99/421 |
| 4,203,357 | 5/1980 | Vaussanvin | 99/340 |
| 5,163,358 | 11/1992 | Hanagan et al. | 99/444 |
| 5,168,798 | 12/1992 | Kristofich et al. | 99/421 |
| 5,172,628 | 12/1992 | Pillsbury et al. | 99/421 |

*Primary Examiner*—George Yeung
*Attorney, Agent, or Firm*—Adams Law Firm, P.A.

[57] ABSTRACT

A rotisserie apparatus and method of cooking food items are provided. The rotisserie apparatus includes a housing containing a heat source for supplying heat to an area above the housing. A plurality of spit supports are positioned on the housing, and extend vertically upwardly from the housing. A plurality of horizontally-disposed spits are carried by the spit supports, and located in vertically-spaced relation above the heat source for holding respective food items to be cooked. Counter-rotating sprockets are operatively connected to the plurality of spits for rotating adjacent spits in opposite directions during cooking, and permitting contacting adjacent food items to counter-rotate away from each other after engaging without being inadvertently forced off the spits.

16 Claims, 5 Drawing Sheets

ROTISSERIE APPARATUS FOR COOKING FOOD ITEMS

TECHNICAL FIELD AND BACKGROUND OF THE INVENTION

This invention relates to a rotisserie apparatus and method of cooking food items. In one application, the invention is used for cooking whole-bird chickens by mounting the chickens on respective spits, and slowly rotating the spits over a gas-heated grill. Dripping grease and/or basting sauces applied to the chicken runs off the chicken during cooking and contacts the hot grill surface to create an upward flow of smoke. The hot smoke helps cook the chicken, and provides a desirable smokey flavor.

To make the most efficient use of cooking space above the grill, the chickens are generally closely spaced together, and will often contact each other when rotating during cooking. Two adjacent, contacting chickens rotating in the same direction will tend to force one another in the direction of rotation, and eventually off the spit and onto the hot, smokey grill surface. In this event, the cook must pick the chicken up off the grill and replace it onto the rotating spit. This slows cooking time, may cause burns to the hands and arms of the cook, and may damage the appearance of the chicken.

The present invention overcomes these and other problems of some prior art rotisseries by providing a rotisserie which rotates adjacent spits in opposite directions during cooking. The counter-rotation helps prevent contacting adjacent food items from being inadvertently forced off the spits. Thus, instead of being forced in the direction of rotation, as discussed above, the present invention forces adjacent food items together at the point of contact. This reduces the likelihood that one or both of the contacting food items will fall off their spit and onto the grill surface during cooking.

SUMMARY OF THE INVENTION

Therefore, it is an object of the invention to provide a rotisserie apparatus which rotates adjacent food items in opposite directions during cooking.

It is another object of the invention to provide a rotisserie apparatus which reduces the likelihood that one or both of two contacting food items will fall off their spit during cooking.

It is another object of the invention to provide a rotisserie apparatus which reduces the occurrence and likelihood of burns to the hands and arms of the cook during cooking.

It is another object of the invention to provide a rotisserie apparatus which makes efficient use of cooking space over the grill surface by closely spacing the food items together.

It is another object of the invention to provide a rotisserie apparatus which cooks food items in an efficient and effective manner.

It is another object of the invention to provide a method of cooking food items using a rotisserie apparatus which rotates adjacent food items in opposite directions during cooking.

These and other objects of the present invention are achieved in the preferred embodiments disclosed below by providing a rotisserie apparatus. The rotisserie apparatus includes a housing containing a heat source for supplying heat to an area above the housing. Spit support means are positioned on the housing, and extend vertically upwardly from the housing. A plurality of horizontally-disposed spits are carried by the spit support means, and located in vertically-spaced relation above the heat source for holding respective food items to be cooked. Counter-rotating drive means are operatively connected to the plurality of spits for rotating adjacent spits in opposite directions during cooking. The drive means permits contacting adjacent food items to counter-rotate away from each other after engaging without being inadvertently forced off the spits.

According to one preferred embodiment of the invention, the spit support means includes a vertically extending rear shroud carried by the housing. The rear shroud has a front wall defining a plurality of spaced-apart openings therein for receiving respective drive ends of the spits.

According to another preferred embodiment of the invention, the spit support means further includes a plurality of elongate spit braces laterally spaced apart along on a front end of the housing opposite the rear shroud. The spit support braces support respective free ends of the spits above the heat source of the housing.

According to yet another preferred embodiment of the invention, the drive means includes a plurality of rotating sprockets located within the rear shroud and operatively connected to the drive ends of the spits for rotating the spits.

According to yet another preferred embodiment of the invention, the respective drive ends of the spits define a plurality of flat sides. The sprockets include respective center sockets located in registration with the front wall openings of the rear shroud. The sockets are shaped to receive the drive ends of the spits in a rotation-locking condition.

According to yet another preferred embodiment of the invention, the drive means includes a travel chain located in the rear shroud and interconnecting the plurality of sprockets in an endless loop. The travel chain runs along opposite sides of adjacent sprockets to rotate the adjacent sprockets in opposite directions.

According to yet another preferred embodiment of the invention, the drive means includes a drive sprocket located in the rear shroud for actuating the travel chain.

According to yet another preferred embodiment of the invention, the drive means includes a motor connected to the drive sprocket for powering the drive sprocket.

According to yet another preferred embodiment of the invention, a grill is laterally disposed within the housing. The grill resides between the heat source and the food item being cooked.

Preferably, the grill has a plurality of top surface openings therein of sufficient dimension o prevent food items from inadvertently falling through the grill to the heat source, yet allowing passage of grease and basting sauces applied to the food item during cooking.

Preferably, a removable grease pan is laterally disposed within the housing. The grease pan resides beneath the heat source for capturing grease and basting sauces dripping from the food items during cooking.

An embodiment of the method according to the invention comprises the steps of locating a plurality of food items to be cooked on respective laterally-disposed spits. The spits are positioned in vertically-spaced relation over a rotisserie apparatus housing containing a heat source for supplying heat to an area above the housing. Adjacent spits are rotated in opposite directions during cooking for permitting contacting adjacent food items to counter-rotate away from each other after engaging without being inadvertently forced off the spits.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
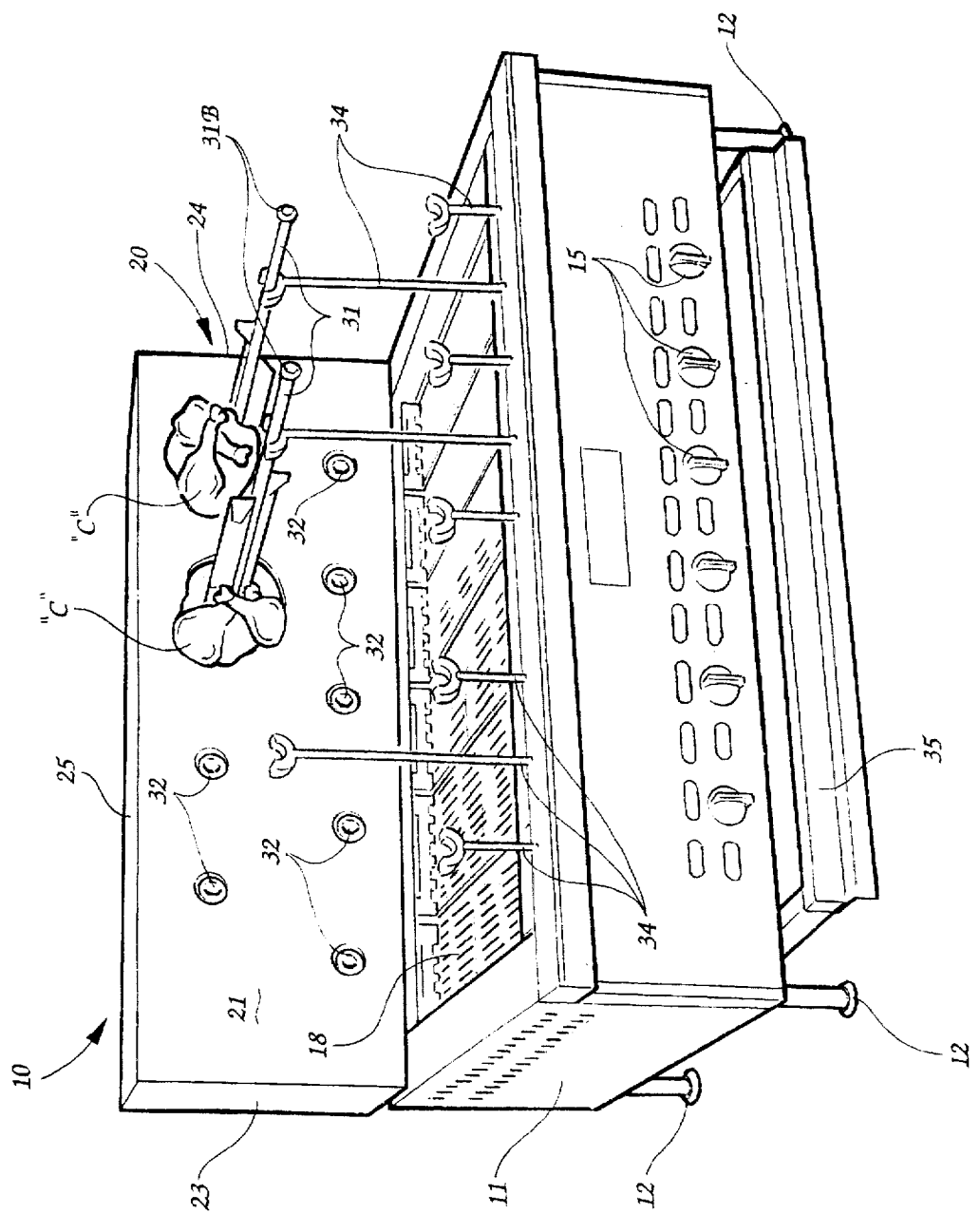
FIG. 1 is a perspective view of a rotisserie apparatus according to a preferred embodiment of the invention.

Referring now specifically to the drawings, a rotisserie apparatus according to the present invention is illustrated in FIG. 1 and shown generally at reference numeral 10. The rotisserie apparatus 10 is adapted for cooking food items "C", such as whole-bird chickens, over a heat source contained in an open-top housing 11. The housing 11 is supported by legs 12, and is mounted on a countertop or kitchen floor of a restaurant.

Figure 2:
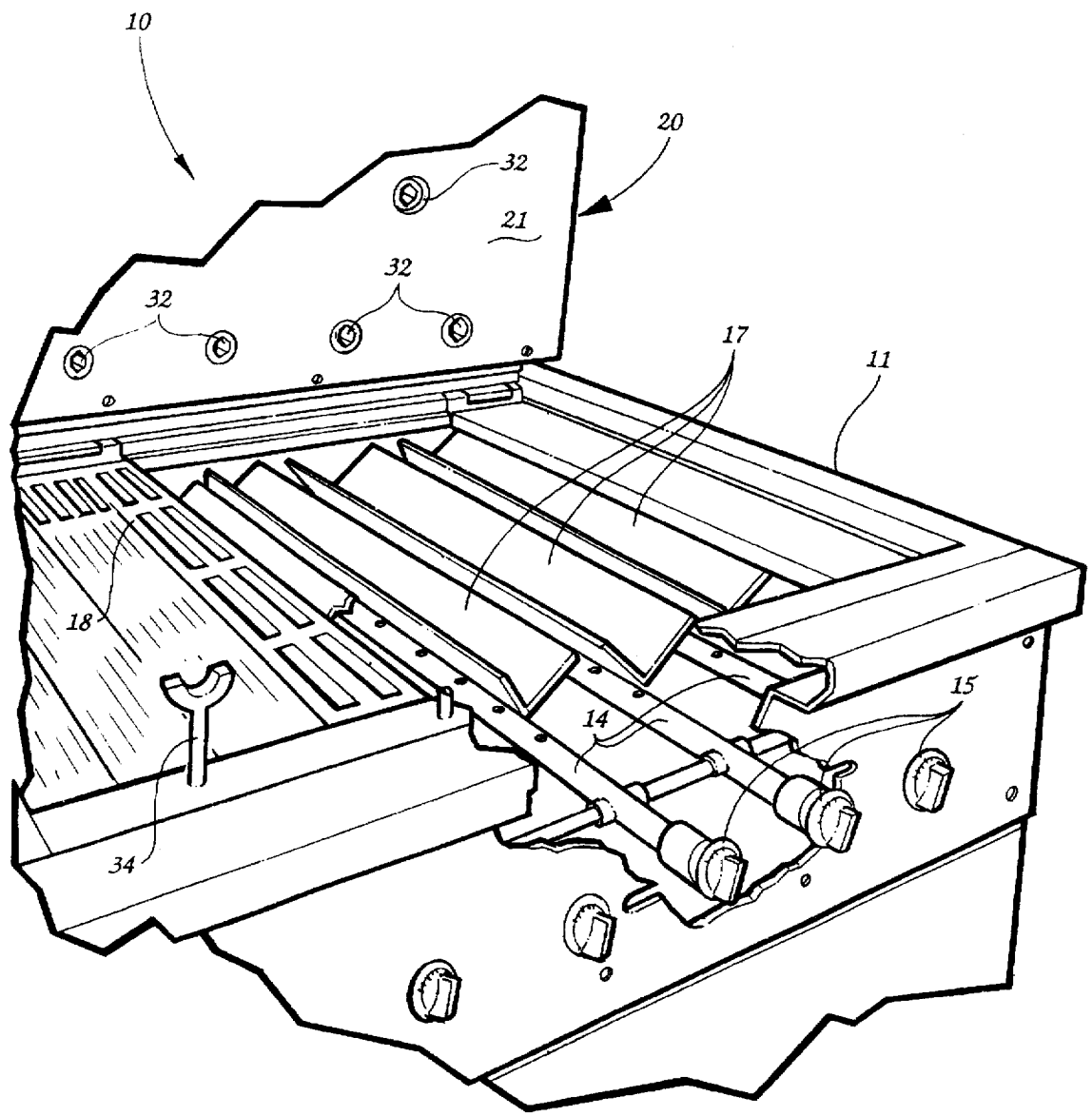
FIG. 2 is a fragmentary perspective view of the rotisserie apparatus with a section of the housing broken away to show the heat source.

In the embodiment shown, the heat source includes several individually controlled gas lines 14 (See FIG. 2) with respective control knobs 15 for being manually operated by the cook. Preferably, the gas lines 14 are shielded from dripping grease and food sauces by laterally disposed covers 17 formed of angle iron segments. In addition, a removable grill 18 may be laid over the covers 17 to cover the open top of the housing 11, and to prevent food items from inadvertently falling though to the gas lines 14. The openings defined in the grill 18 are approximately 0.25 inches wide and 2.0 inches long.

The rotisserie apparatus 10 further includes a rear shroud 20 mounted on a back end of the housing 11. The rear shroud 20 extends vertically above the grill 18, and preferably includes opposing front and back walls 21 and 22, side walls 23 and 24, and a top wall 25. In an alternative embodiment, the rear shroud 20 may be mounted separate from the housing 11 to a wall of a restaurant kitchen, or formed within the kitchen wall.

The food items "C" to be cooked over the grill 18 of the housing 11 are carried by respective spits 31. Each spit 31 has a drive end 31A for being located within an opening 32 formed in the front wall 21 of the rear shroud 20, and a free end 31B carried by a spit brace 34 located along a front end of the housing 11. The rear shroud 20 and spit brace 34 cooperate to vertically support the spits 31 between 6-18 inches above the grill 18.

During cooking, grease and sauces dripping from the rotating food items "C" pass through the grill 18 and contact the heated covers 17 to create an upward flow of smoke. The hot smoke helps cook the rotating food items "C", and adds a resulting desirable smokey flavor to the food items "C". Preferably, a removable grease tray 35 is located at the base of the housing 11 beneath the grill 18 for capturing the grease and sauce run-off from the food items "C" being cooked.

To make the most efficient use of cooking space above the grill 18, the spits 31 reside close together. In one embodiment, the distance between two adjacent spits 31 is approximately 10 inches. The diameter of the food items "C" being cooked is typically between 8-12 inches. Thus, adjacent food items "C" will generally contact each other when rotating during cooking.

To prevent adjacent food items "C" from engaging each other and being inadvertently forced off the spits 31, the rotisserie apparatus 10 includes counter-rotating drive means, as described in detail below. The drive means rotates adjacent spits 31 in opposite directions, and permits contacting adjacent food items "C" to counter-rotate away from each other after engaging.

COUNTER ROTATING DRIVE MEANS

Figure 3:
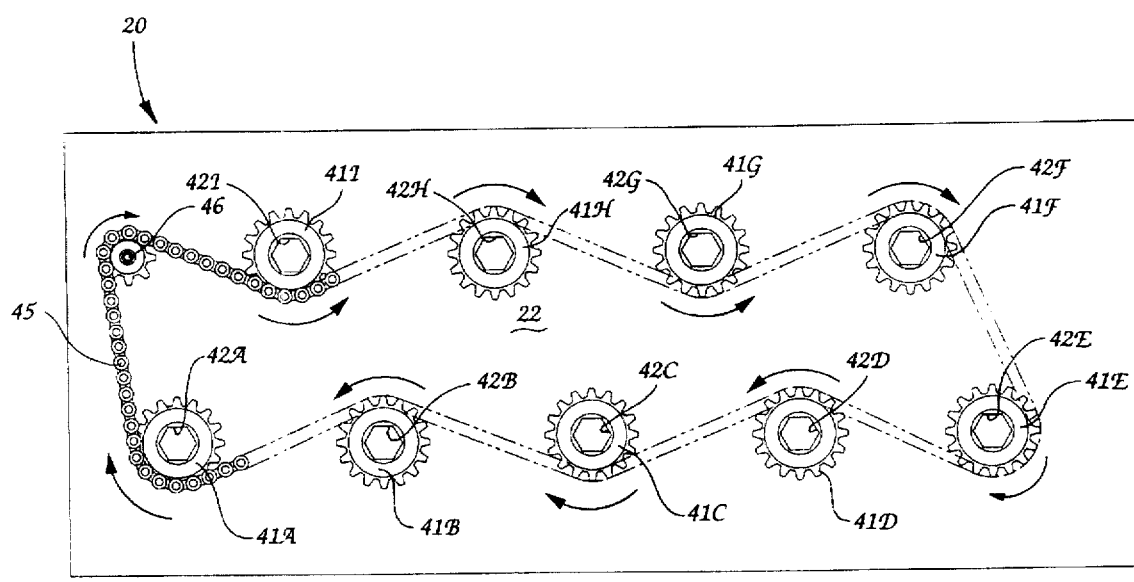
FIG. 3 is an elevational view of the rear shroud with the front wall removed to show the counter-rotating drive means of the rotisserie apparatus.
Figure 4:
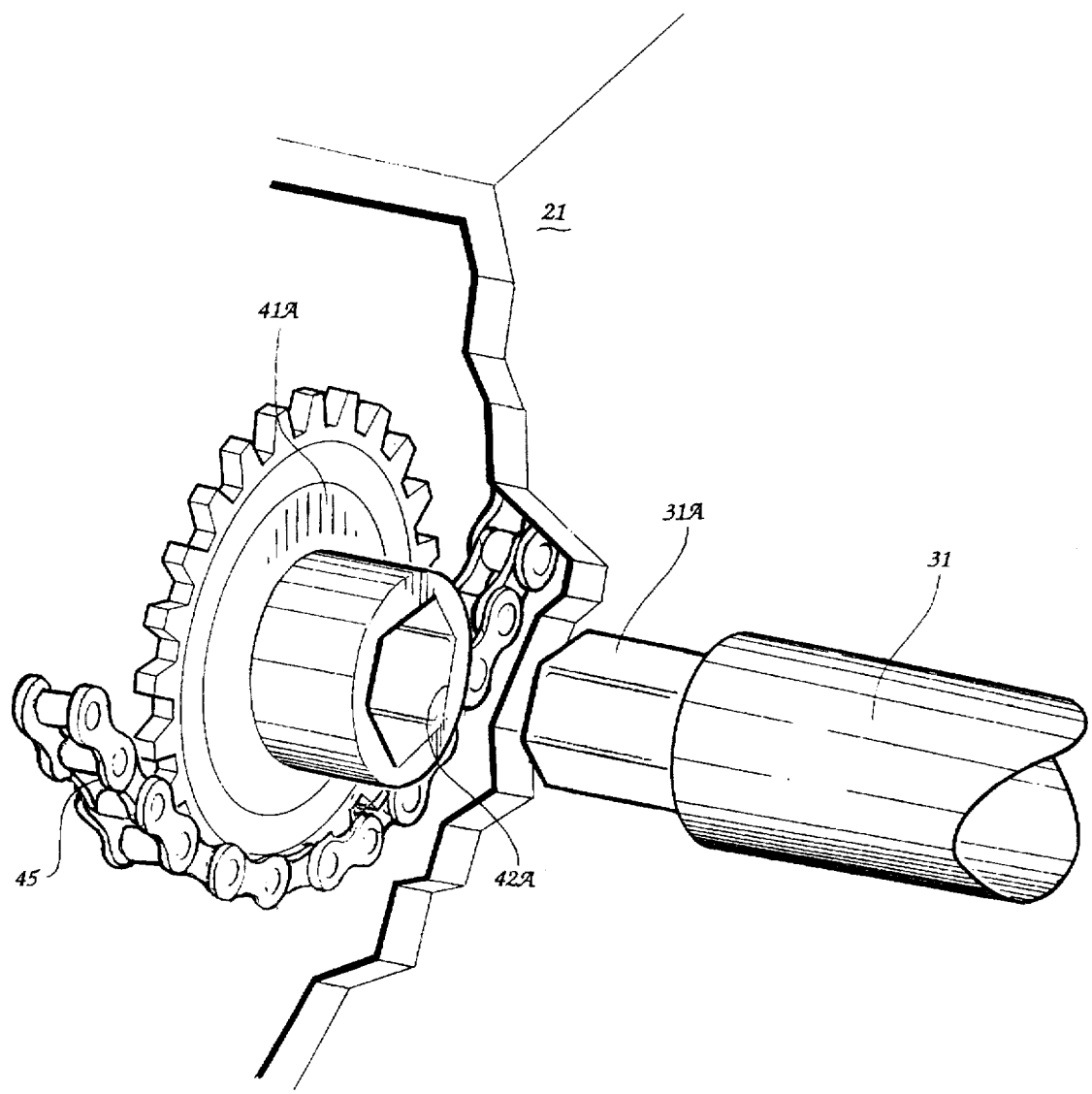
FIG. 4 is an enlarged, fragmentary perspective view of the drive end of a spit for being inserted into the center socket of a sprocket.
Figure 5:
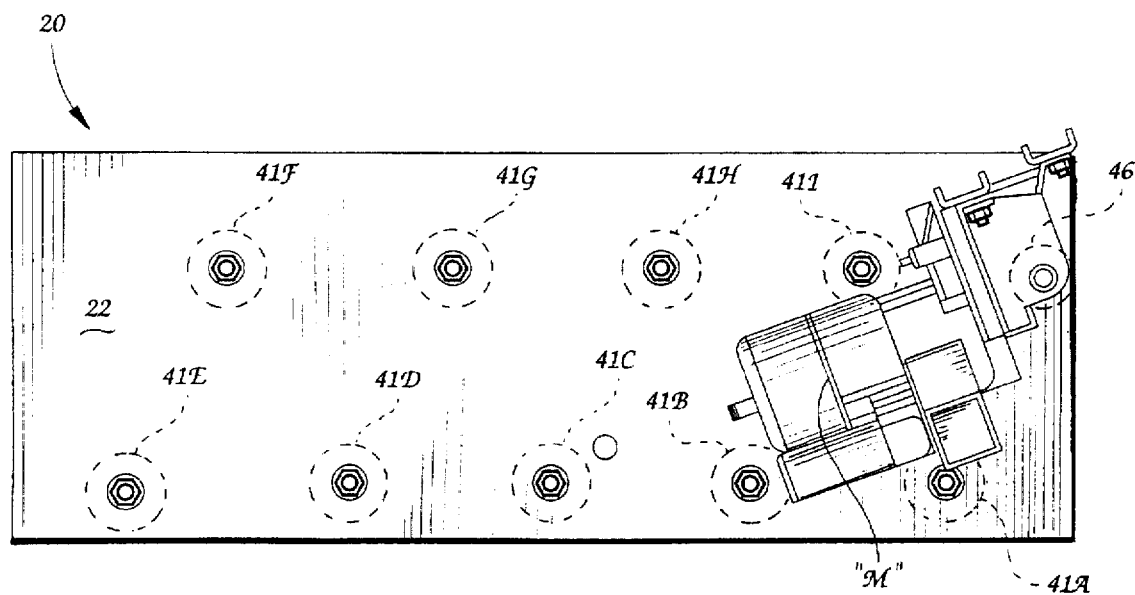
FIG. 5 is a back elevational view of the rear shroud showing the motor for powering the drive sprocket of the drive means.

Referring to FIGS. 3-5, the counter-rotating drive means includes several sprockets 41A-41I located in the rear shroud 20 and rotatably mounted to the back wall 22. The sprockets 41A-41I have respective center sockets 42A-42I formed therein and aligned in registration with the front wall openings 32 of the rear shroud 20. As shown in FIG. 4, the drive end 31A of each spit 31 is preferably hexagonal, and each socket 42A-42I defines a complementary shape for receiving the drive end 31A therein in a rotation-locking condition to interconnect the spit 31 and the sprocket 41A-41I. Sprocket 41A and center socket 42A are illustrated in FIG. 4.

As best shown in FIG. 3, an endless-loop travel chain 45 engages each of the sprockets 41A-41I, and runs along opposite sides of adjacent sprockets 41A-41I to rotate the adjacent sprockets 41A-41I and spits 31 connected thereto in opposite directions. A drive sprocket 46 powered by a 1.1 HP electric motor "M" (See FIG. 5) is connected to the travel chain 45, and actuates the travel chain 45 to drive the sprockets 41A-41I. Thus, the sprocket 41A rotates one spit 31 and a food item "C" carried thereon in a clockwise direction, while adjacent sprocket 41B simultaneously rotates a second spit 31 and food item "C" carried thereon in a counterclockwise direction. The rotation rate of each spit 31 is preferably between 8 and 10 rpm. In addition, the rotisserie apparatus 10 of the embodiment shown can accommodate as many as 9 spits 31 or as few a one spit 31 during cooking.

A rotisserie apparatus and method of cooking a food item are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A rotisserie apparatus, comprising:

(a) a housing containing a heat source for supplying heat to an area above the housing;

(b) spit support means positioned on said housing, and extending vertically upwardly from said housing;

(c) a plurality of horizontally-disposed spits carded by said spit support means and located in vertically-spaced relation above the heat source for holding respective food items to be cooked; and (d) counter-rotating drive means comprising an endless-loop travel chain operatively connected to said plurality of spits for rotating adjacent spits in opposite directions during cooking, and permitting contacting adjacent food items to counter-rotate away from each other after engaging without being inadvertently forced off the spits.

2. A rotisserie apparatus according to claim 1, wherein said spit support means comprises a vertically extending rear shroud carried by said housing, and having a front wall defining a plurality of spaced-apart openings therein for receiving respective drive ends of said spits.

3. A rotisserie apparatus according to claim 2, wherein said spit support means further comprises a plurality of elongate spit braces laterally spaced apart along on a front end of said housing opposite the rear shroud for supporting respective free ends of said spits above the heat source of said housing.

4. A rotisserie apparatus according to claim 2, wherein said drive means comprises a plurality of rotating sprockets located within said rear shroud and operatively connected, respectively, to the drive ends of said spits, and wherein said travel chain and said rotating sprockets cooperate to rotate adjacent spits in opposite directions during cooking.

5. A rotisserie apparatus according to claim 4, wherein the respective drive ends of the spits define a plurality of flat sides, and said sprockets include respective center sockets located in registration with the front wall openings of the rear shroud and shaped to receive the drive ends of the spits in a rotation-locking condition.

6. A rotisserie apparatus according to claim 1, wherein said drive means comprises a drive sprocket operatively connected to the travel chain for actuating the travel chain.

7. A rotisserie apparatus according to claim 6, wherein said drive means comprises a motor connected to the drive sprocket for powering the drive sprocket.

8. A rotisserie apparatus according to claim 1, and comprising a grill laterally disposed within said housing and residing between the heat source and the food item being cooked.

9. A rotisserie apparatus according to claim 8, wherein said grill has a plurality of top surface openings therein of sufficient dimension to prevent food items from inadvertently falling through the grill to the heat source, yet allowing passage of grease and basting sauces applied to the food item during cooking.

10. A rotisserie apparatus according to claim 1, and comprising a removable grease pan laterally disposed within said housing and residing beneath the heat source for capturing grease and basting sauces dripping from the food items during cooking.

11. A rotisserie apparatus, comprising:

(a) a housing containing a heat source for supplying heat to an area above the housing;

(b) a vertically extending rear shroud mounted on a back end of said housing, and having a front wall defining therein a plurality of spaced-apart spit-receiving openings;

(c) a plurality of elongate, vertically extending spit braces laterally spaced apart along on a front end of said housing opposite the rear shroud;

(d) a plurality of horizontally-disposed spits located in vertically-spaced relation above the heat source for holding respective food items to be cooked, and having respective free ends thereof carried by said spit braces and respective drive ends thereof inserted into the openings of the rear shroud; and (e) counter-rotating drive means operatively connected to said plurality of spits and located in said rear shroud for rotating adjacent spits in opposite directions during cooking, and permitting contacting adjacent food items to counter-rotate away from each other after engaging without being inadvertently forced off the spits.

12. A rotisserie apparatus according to claim 11, wherein said drive means comprises a plurality of rotating sprockets located within said rear shroud and operatively connected to the drive ends of said spits for rotating said spits.

13. A rotisserie apparatus according to claim 12, wherein the respective drive ends of the spits define a plurality of flat sides, and said sprockets include respective center sockets located in registration with the front wall openings of the rear shroud and shaped to receive the drive ends of the spits in a rotation-locking condition.

14. A rotisserie apparatus according to claim 13, wherein said drive means comprises a travel chain located in said rear shroud and interconnecting the plurality of sprockets in an endless loop, said travel chain running along opposite sides of adjacent sprockets to rotate the adjacent sprockets in opposite directions.

15. A rotisserie apparatus according to claim 14, wherein said drive means comprises a drive sprocket located in said rear shroud for actuating the travel chain.

16. A rotisserie apparatus according to claim 15, wherein said drive means comprises a motor connected to the drive sprocket for powering the drive sprocket.

* * * * *